(12) United States Patent
Kaplanov et al.

(10) Patent No.: US 7,559,599 B2
(45) Date of Patent: Jul. 14, 2009

(54) PANEL SIDE DOOR STRUCTURE FOR A MOTOR VEHICLE

(75) Inventors: Andreos Kaplanov, Maumee, OH (US); Claude Magniez, Andeville (FR)

(73) Assignee: Faurecia Interior Systems U.S.A. Inc., Auburn Hills, MI (US)

( * ) Notice: Subject to any disclaimer, the term of this patent is extended or adjusted under 35 U.S.C. 154(b) by 157 days.

(21) Appl. No.: 11/668,548

(22) Filed: Jan. 30, 2007

(65) Prior Publication Data

US 2008/0179917 A1 Jul. 31, 2008

(51) Int. Cl.
B60J 5/04 (2006.01)
(52) U.S. Cl. .................................................. 296/146.7
(58) Field of Classification Search .................... 49/503; 296/1.08, 39.1, 146.7, 191
See application file for complete search history.

(56) References Cited

U.S. PATENT DOCUMENTS

| | | | | |
|---|---|---|---|---|
| 4,575,138 A | * | 3/1986 | Nakamura et al. | 292/216 |
| 5,050,351 A | * | 9/1991 | Goldbach et al. | 49/502 |
| 5,193,868 A | | 3/1993 | O'Toole | |
| 5,215,342 A | | 6/1993 | Yuge et al. | |
| 5,588,692 A | * | 12/1996 | Gandhi et al. | 296/146.7 |
| 5,762,394 A | * | 6/1998 | Salmonowicz et al. | 296/146.5 |
| 5,830,559 A | * | 11/1998 | Goldbach et al. | 428/192 |
| 5,833,416 A | * | 11/1998 | Cau | 411/55 |
| 5,868,455 A | * | 2/1999 | Springer et al. | 296/146.1 |
| 5,902,004 A | * | 5/1999 | Waltz et al. | 296/146.9 |
| 6,036,251 A | * | 3/2000 | Yagishita et al. | 296/39.1 |
| 6,196,607 B1 | * | 3/2001 | Gulisano | 296/39.1 |
| 6,257,632 B1 | | 7/2001 | Jung et al. | |
| 6,428,063 B1 | | 8/2002 | Bland | |
| 6,735,822 B2 | * | 5/2004 | Spurr et al. | 16/319 |
| 6,767,049 B1 | * | 7/2004 | Morrison et al. | 296/146.7 |
| 6,811,194 B1 | * | 11/2004 | Gaertner et al. | 296/1.08 |
| 6,814,401 B2 | | 11/2004 | Takada | |
| 2004/0012218 A1 | * | 1/2004 | Granger et al. | 296/1.08 |
| 2004/0084918 A1 | * | 5/2004 | Brandt et al. | 296/1.08 |
| 2005/0189775 A1 | * | 9/2005 | De Pue | 296/1.08 |
| 2006/0017306 A1 | * | 1/2006 | Smith et al. | 296/146.7 |
| 2006/0082173 A1 | * | 4/2006 | Cowelchuk et al. | 296/1.08 |

(Continued)

FOREIGN PATENT DOCUMENTS

JP 56079022 A * 6/1981

(Continued)

Primary Examiner—Glenn Dayoan
Assistant Examiner—Paul A Chenevert
(74) Attorney, Agent, or Firm—Matthew B. Dernier, Esq.; Gibson & Dernier LLP

(57) ABSTRACT

A vehicle door structure and a method for its manufacture are disclosed, the structure being for a vehicle having a door frame and a door mounted in the frame, the door having an interior facing into the vehicle and an edge surface in opposed relationship to the frame when the door is closed, the edge surface including sheet metal. An interior door panel is provided which includes a substrate mounted on the interior of the door, an edge portion of which is adjacent the sheet metal. A skin interiorly overlies the substrate to define an interior surface for the door, the skin extending from the door interior over the edge portion, beyond the substrate and onto the sheet metal. Flexing of or movement of the skin permits it to compensate for differences in position of the substrate when mounted on the door.

19 Claims, 3 Drawing Sheets

U.S. PATENT DOCUMENTS

| | | | |
|---|---|---|---|
| 2007/0040404 A1* | 2/2007 | Williams et al. | 296/39.1 |
| 2007/0222249 A1* | 9/2007 | Valentage et al. | 296/39.1 |
| 2007/0222256 A1* | 9/2007 | Valentage et al. | 296/146.6 |
| 2008/0073813 A1* | 3/2008 | Smith et al. | 264/266 |

FOREIGN PATENT DOCUMENTS

JP        10-329751        12/1998

* cited by examiner

US 7,559,599 B2

PANEL SIDE DOOR STRUCTURE FOR A MOTOR VEHICLE

BACKGROUND OF THE INVENTION

The present invention relates generally to side door structures for motor vehicles and their method of manufacture, and more particularly, such a structure which permits a decorative interior skin of the door to extend beyond interior door surface and around the side edge, so that so seams or skin edges are not visible.

Automobile side doors typically have a decorative interior skin, such as fabric, vinyl or leather with an underlying support structure or substrate. The skin may cover the entire interior surface of the door, with only handles, knobs, and such, protruding through the skin.

In most vehicles, this skin stops at the rear edge of the door, with its edge clearly visible. It would be desirable, from an aesthetic point of view, to have the skin extend smoothly around the edge of the door so that its edge is not visible. FIG. 1 is a fragmentary schematic, sectional view of an automotive front door or the driver's side, as seen from below. In this example, the door has a striker bezel Z which contains an upwardly (in FIG. 1) protruding hook (see FIG. 2),which is captured within a latch in the door frame of the vehicle. Bezel Z mounts on the sheet metal D at the edge of the door. Towards the exterior of the door, a striker bezel Z is also mounted over the sheet metal.

On the right side of FIG. 1 a typical skin wrap-around door construction, where there are shown a portion of the substrate B which supports the skin and a portion of the skin N, which has been laminated over the substrate B and bent around the edge of the door and stops short of the striker bezel. This conceals the edge of the skin from the interior of the vehicle.

This provides the desired interior effect of the skin, with the edge of the skin being hidden between the door and door frame when the door is closed. However, there is a manufacturing tolerance of ±3 mm between the bottom edge (in FIG. 1) of substrate B and the top edge of sheet metal D.

FIG. 1 illustrates the nominal orientation between skin N and bezel Z. However, when the manufacturing tolerance of plus or minus 3 mm is taken into account, the top surface of skin N may be substantially below or above the top surface of bezel Z. In its highest position, skin N is sufficiently above bezel Z to create an unattractive gap between the skin and the striker bezel (seen when the door is open). It also creates the possibility that some portion of the end of the skin can be snagged and damaged by a sharp or jagged element. At its lowest position, skin N is sufficiently below bezel Z to create an unattractive gap between them. Thus, the wrap around skin creates a desirable interior appearance when the door is closed, but manufacturing tolerances result in difficulties in controlling the gap between skin N and striker bezel Z, and the possibility that the edge of the skin can be damaged or torn.

SUMMARY OF THE INVENTION

In accordance with one aspect of the present invention, a vehicle door of improved appearance is provided by wrapping the skin around the edge of the vehicle door, over the substrate and sheet metal, and under the bezel. In a first embodiment, the wrapped portion of the skin extends all the way to the outside gasket of the door, providing a particularly clean look. With this type of construction, the portion of the skin between the edge of the substrate and the bezel acts as a kind of a hinge and can bend enough to absorb the entire range of substrate positions.

Two types of preferred constructions are disclosed. In one, the bezel presses the skin against the sheet metal of the door. In the other, a two-part bezel is provided with opposed upper and lower parts, and the skin being pressed between the upper and lower parts.

In accordance with another aspect of the invention, the bezel presses against and holds the skin with a low enough force to permit it to slide relative to the bezel. With this construction, the skin can accommodate the entire range of substrate positions, while experiencing minimum stress at the point where it bends.

BRIEF DESCRIPTION OF THE DRAWINGS

The foregoing brief description and further objects, features and advantages of the present invention will be understood more completely from the following detailed description presently preferred, but nonetheless illustrative, embodiments in accordance with the present invention, with reference being had to the accompanying drawings in which:

FIG. 5A showing the substrate in its most distant assembled position above the door sheet metal; FIG. 5B showing the substrate in its nominal position; and FIG. 5C showing the substrate in its furthest assembled position below the door sheet metal.

DETAILED DESCRIPTION OF THE PREFERRED EMBODIMENTS

Figure 1:
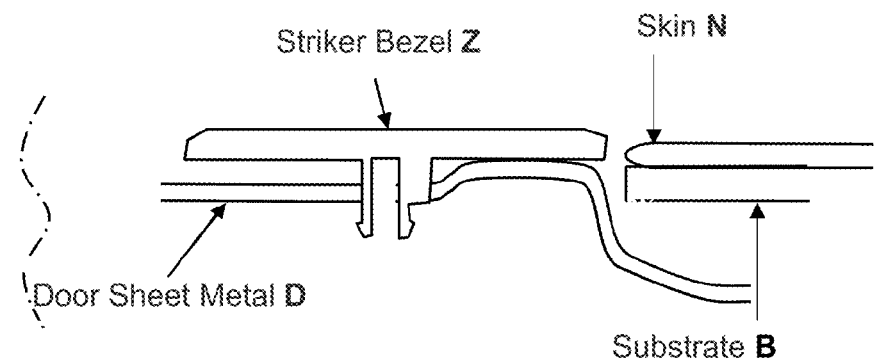
FIG. 1 is a fragmented schematic, sectional view, as seen from below, of a vehicle door in which the skin has been folded over so as to lie between the edge of the door and door frame when the door is closed.
Figure 2:
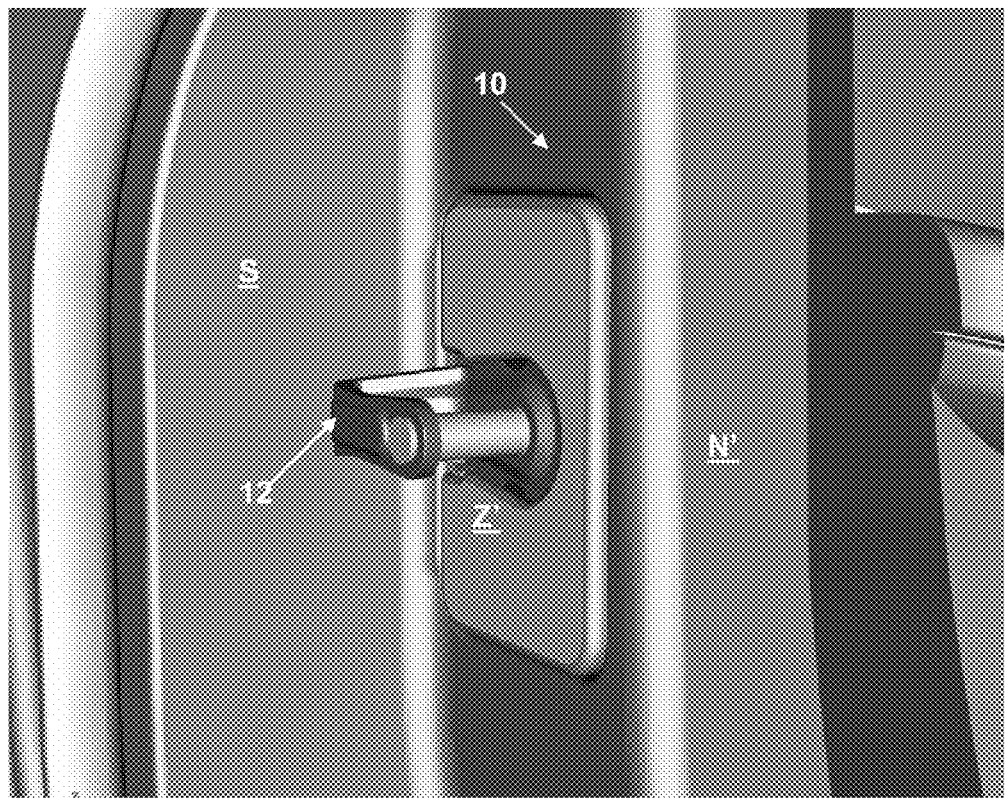
FIG. 2 is a perspective view of the edge of a door embodying one aspect of the present invention.
Figure 3:
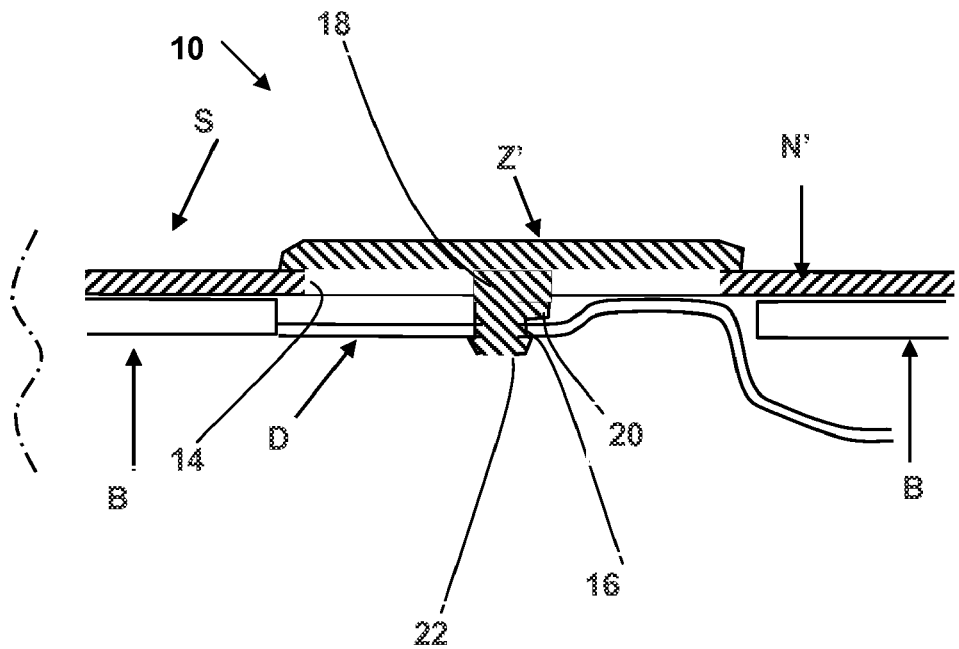
FIG. 3 is a schematic view, similar to FIG. 1, showing a first embodiment of a door construction in accordance with the present invention.

Turning now to the drawings, FIG. 2 is a perspective view showing the edge of a driver's door for an automobile which incorporates a first embodiment 10, of a door structure in accordance with the present invention. FIG. 3 is a schematic, fragmentary sectional view of the door of FIG. 2 as seen from below. As is customary, the door includes a structural frame (not shown) and an outer covering of sheet metal D. At the inner edge of the door, the skin N', which covers the interior of the door, has been folded over the edge of substrate B and into contact with the door sheet metal D which supports the skin. As may be seen, in this embodiment, the edge of the skin N' extends over the entire edge of the door, including the rearwardly extending portion of the edge S. Preferably, the skin is laminated over the substrate B.

Aligned openings 14-16 have been cut in skin N' and sheet metal D, respectively. A bezel Z' is provided which has a protruding hook 12 that is captured by a latch in the door frame (not shown) to keep the door closed. Bezel Z' has a downwardly protruding member 18, and it is placed upon the skin N' and with its undersurface in contact therewith, whereby the member 18 protrudes through the opening 16. A seat 20 then rests upon sheet metal D. It is contemplated that seat 20 retains the undersurface of bezel Z' at such a height that the skin N' may slide under it. The purpose of this is discussed further with respect to the second embodiment.

Member 18 has a widened forward portion 22 which tapers downwardly. At its lower end portion 22 with a small enough diameter to fit into opening 16. Thereafter, when bezel Z' is pressed downwardly, the forward end 22 deforms so as to fit through the opening 16 and once again snaps back to its normal diameter after it passes through opening 16. As a result, bezel Z' is securely retained against removal from sheet metal D and retains skin N' against sheet metal D. As may be seen in FIG. 2, with skin N' retained over sheet metal D and extending to the gasket G, the door has a particularly attractive appearance.

Figure 4:
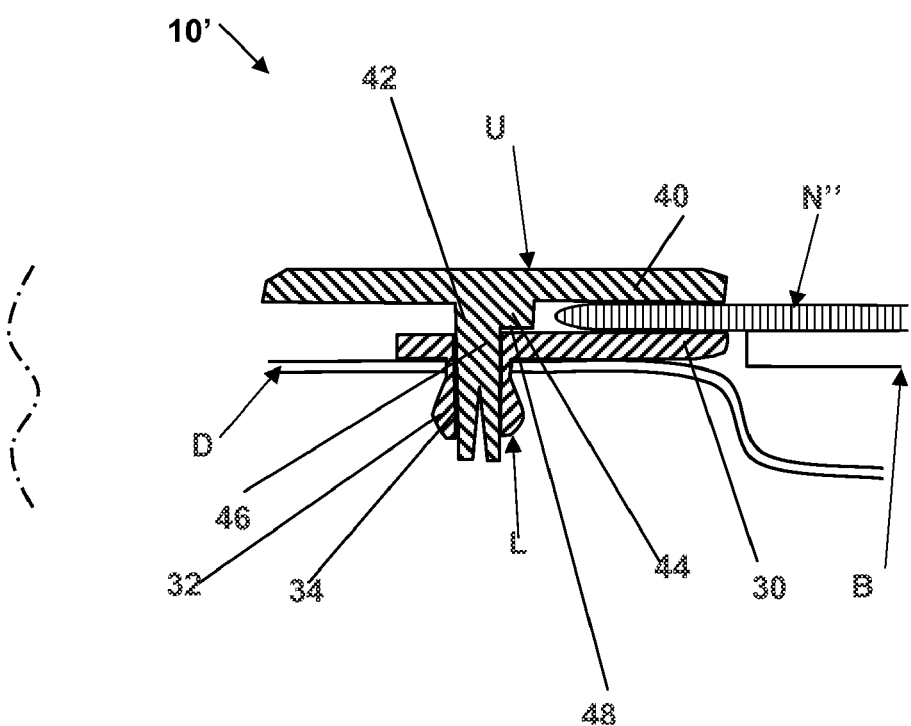
FIG. 4 is a schematic view, similar to FIG. 1 showing a second embodiment of a door construction in accordance with the present invention.

FIG. 4 is a fragmentary sectional view, similar to FIG. 3 of a second embodiment 10' of a door construction in accordance with the present invention. In this embodiment, the bezel comprises an upper portion U and a lower portion L. Portion L comprises a flat body 30 with a hollow downward protrusion 32, which increases in diameter downwardly. Lower portion L is assembled to the door by placing it upon sheet metal D and pressing it downwardly, whereupon protrusion 32 contracts radially and is forced through opening 16, expanding once again to its original diameter after passing through opening 16.

With lower portion L so positioned, the end of the skin N", which extends around and is preferably laminated on substrate B, is placed over element L.

Upper bezel portion U has a flat upper portion 40 and a downwardly protruding member 42. Member 42 has an upper portion 44 and a downwardly projecting lower portion 46 of smaller diameter than portion 44. Lower element L has a through-bore 34 extending through it, and lower portion 46 is dimensioned to be received firmly in bore 34 where protrusion 42 transitions from upper portion 44 to lower portion 46, a seat 48 is defined.

With skin N" lying on portion 30 of element L, lower portion 46 of element U is forced into the bore 34 and downwardly until seat 48 contacts portion 30. Portion 46 is retained within bore 34 as a result of tight fit and the spreading of its lower end, which has an axial "V" cut. and, at the same time, it forces portion 32 of element L outwardly, causing both elements U and L to be retained securely within sheet metal D. Skin N" is then captured between elements U and L and retained in position. For a reason to be explained below, the height of portion 44 is controlled by seat 48 so that skin N" may have some horizontal movement relative to the portions U, L.

Figure 5A:
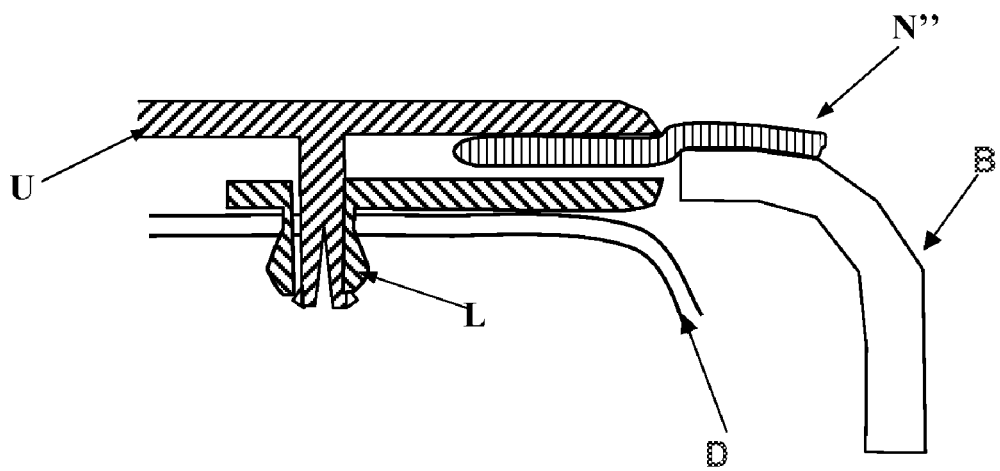
FIGS. 5A, 5B and 5C are schematic views, similar to FIG. 4, illustrating a construction in accordance with the second embodiment of the invention, with the substrate illustrated in different orientations of the substrate that may arise within manufacturing tolerances.
Figure 5B:
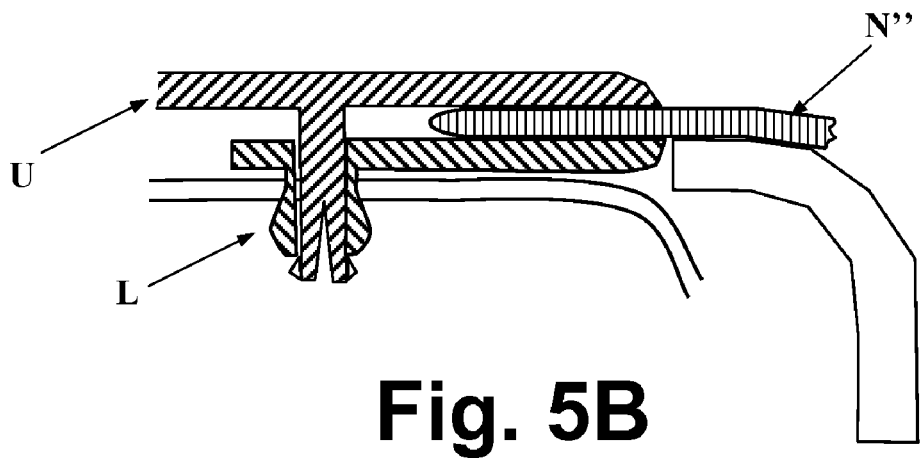
Figure 5C:
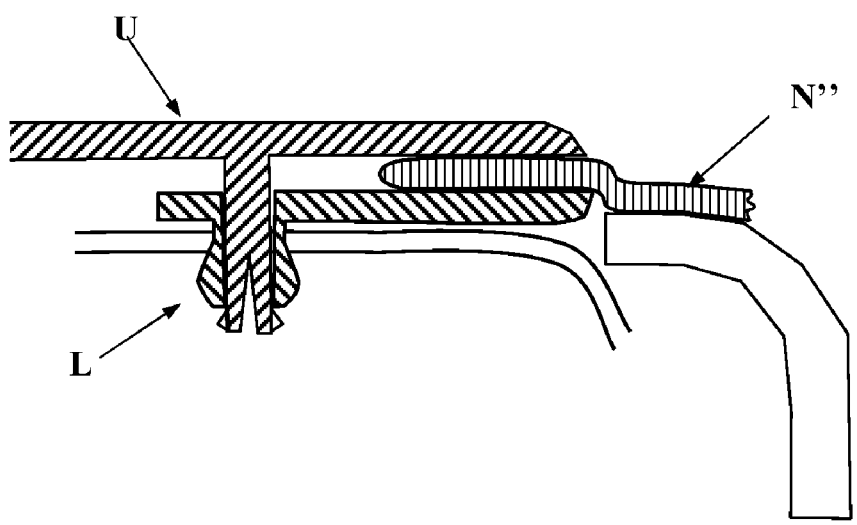

FIGS. 5A, 5B and 5C are schematic views similar to FIG. 4 showing three possible ways in which skin N" may be mounted. As a result of manufacturing tolerances, after the door is assembled, substrate B can be in a continuum of different orientation relative to sheet metal D, over a range of 6 mm. FIG. 5B illustrates the nominal relationship between substrate B and sheet metal D. Under these circumstances, the top surfaces of substrate B and element L are aligned, and skin N" is flat.

FIG. 5A illustrates the situation in which substrate B is in its furthest position above sheet metal D (i.e. the furthest rearward position, in the automobile, of substrate B). In this case, the upper surface of substrate B is higher than the upper surface of element L, and the portion of skin N" therebetween bends upwardly. It is also contemplated that, since skin N' can move laterally with respect to elements U and L, skin N' can be bent with a minimum amount of stress occurring at the bend. This can avoid damage to the skin in the event that small changes in door geometry occur over the life of the vehicle, or during assembly of vehicle.

FIG. 5C shows a substrate B in its opposite extreme position, that is, its lowermost position. In this case, skin N' is bent downward, and as before, it can move laterally relatively to elements U and L as far as to minimize the amount of stress caused by the bend.

In any event, through the entire range of movement of substrate B, skin N' exhibits only a minimum amount of bending, and no gaps are visible between substrate B and sheet metal D or skin N' and the bezel U, L.

Owing to the more attractive appearance, the embodiments 10 and 10' illustrate a door construction in which the loop 12 is on the door and a cooperating latch is on the door frame. More commonly, the loop 12 is on the door frame and the latch is inside the door edge positioned to cooperate with loop 12. Although, in this alternate construction, it would be necessary to cut openings in skin N' to provide access to the latch, a door construction in accordance with the present invention, could, nonetheless be achieved. In this case, the bezel could be in the form of a frame around the skin opening which mounts to the door edge and over the skin.

Although preferred embodiments of the invention have been disclosed for illustrative purposes, those skilled in the art will appreciate that many additions, modifications, and substitutions are possible without departing from the scope and spirit of the invention as defined by the accompanying claims. For example, the invention is not limited to a door but could be used on an instrument panel or console. It is not intended that the claims be limited to doors.

What is claimed:

1. A vehicle door structure for a vehicle having a door frame, the vehicle door structure comprising:
    a door being sized and shaped to mount in the door frame and having an interior for facing into the vehicle and an edge surface in opposed relationship to the frame when the door is closed, the edge surface including sheet metal;
    an interior door panel including a substrate mounted on the interior of the door, an edge portion of said substrate being adjacent the sheet metal, and a flexible skin interiorly overlying said substrate to define an interior surface for the door, the skin extending from the door interior, over the edge portion, and onto the sheet metal; and
    a striker bezel mounted to the sheet metal, the striker bezel having an undersurface overlying the skin and in contact therewith, such that the skin is interposed between the undersurface and the sheet metal.

2. A vehicle door structure in accordance with claim 1, wherein the skin extends across the sheet metal to cover substantially the entire edge surface.

3. A vehicle door structure in accordance with claim 1, wherein the striker bezel has a spacing element which retains said undersurface a predetermined distance above the sheet metal, limiting the force on the underlying skin so that the skin may slide relative to the sheet metal.

4. A vehicle door structure in accordance with claim 1, wherein the striker bezel has a spacing element which retains said undersurface a predetermined distance above the sheet metal, limiting the force on the underlying skin so that the skin may slide relative to the sheet metal.

5. A vehicle door structure in accordance with claim 4, further comprising a component mounting the striker bezel to the sheet metal so that the skin is retained therebetween.

6. A vehicle door structure in accordance with claim 1, wherein the striker bezel has a main body containing the undersurface and a depending leg protruding from the undersurface and secured to the sheet metal.

7. A vehicle door structure in accordance with claim 6, wherein the protruding leg extends through the sheet metal and farther comprising an element at an end thereof that secures the leg to the sheet metal.

8. A vehicle door structure in accordance with claim 1, wherein the striker bezel includes an upper component having an undersurface overlying the sheet metal and in contact with the skin and a lower component having an upper surface overlying the sheet metal and in oppose relationship to said undersurface, the skin being interposed between said undersurface and said upper surface.

9. A vehicle door structure in accordance with claim 8, wherein the skin extends across the sheet metal to cover substantially the entire edge surface.

10. A vehicle door structure in accordance with claim 8, wherein the striker bezel has a spacing element maintaining a predetermined spacing between said undersurface and said upper surface, limiting the force on the interposed skin so that the skin may slide relative to said undersurface and said upper surface.

11. A vehicle door structure in accordance with claim 8, wherein said lower component has a main body containing the upper surface and a depending leg secured to the sheet metal.

12. A vehicle door structure in accordance with claim 11, wherein said upper component has a main body containing the undersurface surface and a depending leg secured to the sheet metal.

13. A vehicle door structure in accordance with claim 12, wherein said lower component depending leg is hollow, said upper component depending leg being dimensioned and shaped to fit within said lower component depending leg, at least said lower component depending leg protruding leg extending through the sheet metal, further comprising cooperating elements on said depending legs securing said legs together and to the sheet metal.

14. A method for applying a skin to a vehicle door structure for a vehicle having a door frame and a door mounted in the frame, the door having an interior facing into the vehicle and an edge surface in opposed relationship to the frame when the door is closed, the edge surface including sheet metal, the door structure comprising an interior door panel including a substrate mounted on the interior of the door, an edge portion of said substrate being adjacent the sheet metal, the method comprising:

mounting said skin interiorly overlying said substrate to define an interior surface for the door;

folding an end of the interiorly mounted skin over the edge portion, and onto the sheet metal; and mounting a striker bezel to the sheet metal, the striker bezel having an undersurface, the striker bezel being mounted so that the undersurface is in contact in with the skin.

15. The method of claim 14, further comprising extending the skin across the sheet metal so as to cover substantially the entire edge surface.

16. The method of claim 14 wherein said mounting step includes mounting said striker bezel so that the undersurface is at a predetermined distance above the sheet metal, the distance being calculated to limit the force on the underlying skin so that the skin may slide relative to the sheet metal.

17. The method of claim 14, wherein the striker bezel includes an upper component having an undersurface overlying the sheet metal and in contact with the skin and a lower component having an upper surface overlying the sheet metal and in opposed relationship to said undersurface, and the method further comprises mounting the striker bezel so the skin is interposed between the undersurface and the upper surface.

18. The method of claim 17, wherein said bezel mounting step comprises:

mounting the lower component to the sheet metal so that the skin is over the upper surface; and mounting the upper component so that the undersurface is in contact in with the skin.

19. The method of claim 18 wherein mounting the upper element includes mounting said striker bezel so that the undersurface is at a predetermined distance from the upper surface, the distance being calculated to limit the force between undersurface and upper surface so that the skin may slide relative to the sheet metal.

* * * * *